United States Patent [19]
Okumoto et al.

[11] Patent Number: 5,306,450
[45] Date of Patent: Apr. 26, 1994

[54] METHOD OF PRODUCING WOOD TYPE GOLF CLUB HEAD

[75] Inventors: Takaharu Okumoto, Chigasaki; Toshio Kobayashi, Ninomiya; Heihatiro Soeda; Kazuo Kawada, both of Hiratsuka, all of Japan

[73] Assignee: The Yokohama Rubber Co., Ltd., Tokyo, Japan

[21] Appl. No.: 925,263

[22] Filed: Aug. 6, 1992

[30] Foreign Application Priority Data

Aug. 13, 1991 [JP] Japan .................. 3-202918
Sep. 30, 1991 [JP] Japan .................. 3-250906

[51] Int. Cl.⁵ .............................. B29D 9/00
[52] U.S. Cl. .................. 264/45.1; 264/328.1; 264/297.2; 264/259; 264/45.4; 273/167 R; 273/167 H; 273/169; 273/DIG. 23
[58] Field of Search .......... 273/167 R–177A, 273/77 A, DIG. 23, 193 R, 194 R, 194 B, DIG. 3, DIG. 6, DIG. 8; 264/45.4, 46.6, 328.1, 297.2, 271.1, 275, 278, 279, 279.1, 259, DIG. 44, 45.1

[56] References Cited

U.S. PATENT DOCUMENTS

| | | | |
|---|---|---|---|
| 4,449,707 | 5/1984 | Hayashi et al. | 273/167 H |
| 4,545,580 | 10/1985 | Tomita et al. | 273/167 R |
| 4,553,755 | 11/1985 | Yamada | 273/171 |
| 4,614,627 | 9/1986 | Curtis et al. | 273/167 H X |
| 4,624,460 | 11/1986 | Murase et al. | 273/167 H |
| 4,650,626 | 3/1987 | Kurokawa | 273/167 R X |
| 4,667,963 | 5/1987 | Yoneyama | 273/169 |
| 4,687,205 | 8/1987 | Tominaga et al. | 273/169 |
| 4,778,185 | 10/1988 | Kurokawa | 273/167 H |
| 4,803,023 | 2/1989 | Enomoto et al. | 273/167 H X |
| 4,824,116 | 4/1989 | Nagamoto et al. | 273/171 |
| 4,867,458 | 9/1989 | Sumikawa et al. | 273/167 H X |
| 5,007,643 | 4/1991 | Okumoto et al. | 273/167 H X |
| 5,135,227 | 8/1992 | Okumoto | 273/167 R |

FOREIGN PATENT DOCUMENTS 1-265980 10/1989 Japan .

Primary Examiner—William H. Grieb
Assistant Examiner—Sebastiano Passaniti
Attorney, Agent, or Firm—Finnegan, Henderson, Farabow, Garrett & Dunner

[57] ABSTRACT

A method of producing a wood type golf club head which comprises molding and curing integrally an outer shell portion of a head main body having a hollow portion thereinside and equipped with a recess on at least one of the toe, back and heel sides thereof facing the hollow portion, from a synthetic resin as a main material, fixing a weight member having an adjustable weight into the at least one recess, packing a core member into the hollow portion, and fitting a sole plate to a sole portion of the club head.

10 Claims, 4 Drawing Sheets

METHOD OF PRODUCING WOOD TYPE GOLF CLUB HEAD

BACKGROUND OF THE INVENTION

The present invention relates to a method of producing a wood type golf club head and a wood type golf club head produced thereby. More particular, the wood type golf club head of the present invention is capable of stably fitting a weight member and of easily adjusting the weight and the centroid position.

In wood type golf club heads molded from a synthetic resin as a main material in general, a weight member is buried with a core member in the head main body to adjust the weight. The core member and the weight member (particularly the latter) form an important constituent element for controlling impact performance of the wood type golf club by its weight and its centroid. The weight member is made of a metal, such as a lead and brass, and is buried on back and toe sides and/or on the heel side of the head main body.

When the conventional weight member is buried and fixed on the back side of the head main body, for example, the weight member is disposed at a position on the back side of the core member, a molding raw material for forming an outer shell portion of the head main body is wound from above on the weight member, and is molded inside a die. Therefore, the position of the weight member is likely to deviate when it is fitted into the molding die or at the time of heat-pressing after mold clamping, so that a centroid error occurs and molding is extremely difficult. Moreover, an error in the position of the weight member also can occur by the impact at repeated hitting of balls, and there remains the problem that the position of the weight member cannot be made stable.

Japanese patent application *Kokai* publication No. 64-265980 proposes a method of producing a wood type golf club head by forming protruding support legs on the weight member and fitting the support legs into support holes bored in the core member. This method improves the production of the wood type golf club head described above and stabilizes the fitting of the weight member. According to this method, a raw material for molding the outer shell portion of the head main body is wound first on the core member. Next, after the molding blank material is passed through, the support legs of the weight member are fitted into the support holes of the core member. After the molding blank material is wound on the weight member, an assembly is fitted into the mold and is heat-pressed to form the head main body. According to this method of producing the wood type golf club head, however, a great deal of labor and time are necessary for positioning the weight member and for the molding operation, and design of the centroid and the centroid depth cannot be made so easily.

SUMMARY OF THE INVENTION

It is an object of the present invention to provide a method of producing a wood type golf club head capable of easily adjusting the weight and the centroid position, and such a wood type golf club head.

It is another object of the present invention to provide a method of producing a wood type golf club head capable of stably fitting a weight member, and such a wood type golf club head.

It is a further object of the present invention to provide a method of producing a wood type golf club head capable of facilitating a molding operation and improving drastically work efficiency and productivity, and such a wood type golf club head.

To accomplish the objects described above, a method of producing a wood type golf club head according to the present invention comprises molding and curing integrally an outer shell portion of a head main body having a hollow portion thereinside and equipped with a recess on at least one of the toe, back and heel sides thereof facing the hollow portion, from a synthetic resin as a main material, fixing a weight member having an adjustable weight into the at least one recess, packing a core member into the hollow portion, and fitting a sole plate to a sole portion.

When an outer shell portion of a head main body having a hollow portion thereinside and equipped with a recess on at least one of the toe, back and heel sides thereof facing the hollow portion is molded and cured integrally from a synthetic resin as a main material, the present invention is characterized in that a weight member having an adjustable weight and fitted tentatively to a core is disposed in the at least one recess, the outer shell portion and the weight member are integrally molded, a core member is packed into the hollow portion and a sole plate is fitted to a sole portion.

In the wood type golf club head produced by the method described above wherein the outer shell portion of the head main body is made of a synthetic resin as a main material and the core member is buried in the hollow portion defined inside the outer shell portion, the wood type golf club head according to the present invention is characterized in that a recess is disposed on at least one of the back, toe and heel sides of the outer shell portion facing the hollow portion, and a weight member having an adjustable weight is disposed in the at least one recess.

In the present invention, after the outer shell portion equipped with a recess on at least one of the back, toe and heel sides of the head main body is formed, a weight member is fixed into the at least one recess, or a weight member is disposed in a recess disposed on at least one of the toe, back and heel sides of the head main body, and then the outer shell portion and the weight member are molded integrally. Therefore, the weight member can be fitted stably and easily, and the weight of the head main body and the centroid can be adjusted easily by the weight member. Since the weight of the head main body can be distributed extensively to the back side, or to the toe side and the heel side, a sweet area can be expanded easily. The present invention can facilitate a molding operation of the wood type golf club head, and can improve drastically operation efficiency and productivity.

DESCRIPTION OF THE PREFERRED EMBODIMENTS

Figure 1:
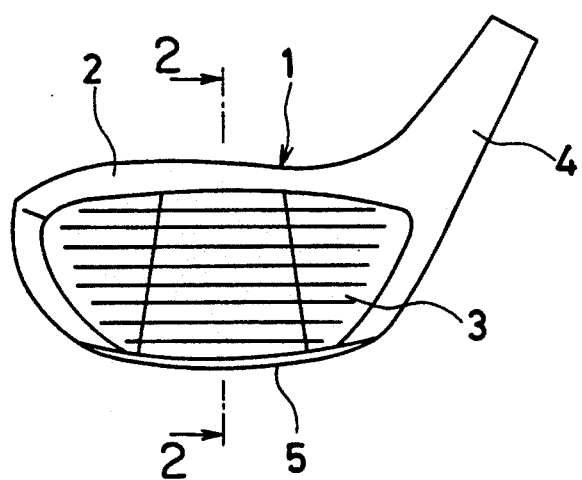
FIG. 1 is a front view of a wood type golf club head produced according to a production method of the present invention.
Figure 2:
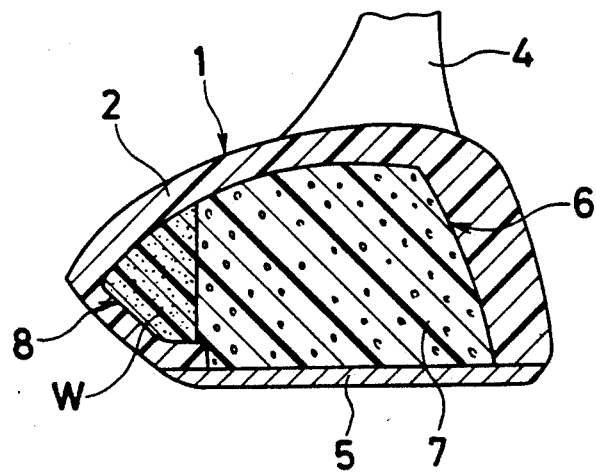
FIG. 2 is the sectional view taken along a line 2—2 of FIG. 1.
Figure 3:
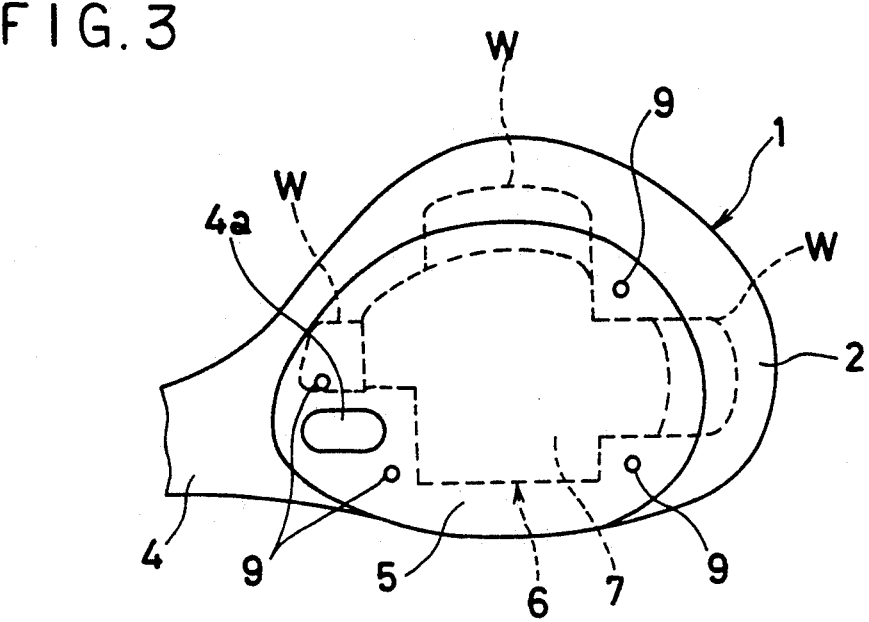
FIG. 3 is a bottom view of the club head of FIG. 1.

FIGS. 1 to 3 show a wood type golf club head produced by a production method of the present invention. In this wood type golf club head, reference numeral 1 represents a head main body, and reference numeral 2 an outer shell portion of the head main body. This head main body 1 includes a face portion 3 for hitting a ball on the front side and a hosel 4, having a hole 4a into which a club shaft (not shown) is inserted, on the heel side. A sole plate 5 is fixed to the bottom (sole) of the head main body 1. A hollow portion 6 is formed inside the outer shell shell portion 2, and a core member 7 is packed into this hollow portion 6. Recesses 8 are formed on the back side, the toe side and the heel side of the outer shell portion 2 facing the hollow portion 6, and weight members W, the weight of which is adjustable, are disposed in the recesses 8.

The outer shell portion 2 of the head main body 1 is made of a synthetic resin as a main material. A thermoplastic resin such as a Nylon resin ABS resin, PC resin and so forth, and a heat-setting resin such as an epoxy resin, vinyl ester resin and an unsaturated polyester resin can be used as this resin. The synthetic resin preferably contains reinforcing fibers to improve the strength of the outer shell portion 2. Carbon fibers, glass fibers, aromatic polyamide fibers, etc, having a high strength and a high elastic modulus, are used preferably as this reinforcing fiber.

The core member 7 is made of a foamable material. Examples of the foamable material include hollow micro-capsule foamable beads consisting of a vinylidene chloride/acrylonitrile copolymer, for example, as a shell, so capsulated as to entrap therein isobutane as a foaming agent (e.g. "EXPANCEL", a product of Nippon FILLITE K.K.), and having heat expansibility rigid polyurethane, foamable styrol, and so forth. A syntactic foam prepared by mixing glass micro-balloons in a matrix resin can also be used as the core member 7. Heat-setting resins such as a vinyl-ester resins, epoxy resins, unsaturated polyester resins, etc, can be used as the matrix resin of the syntactic foam.

The weight member W consists of a metal having a high specific gravity such as tungsten, lead, zinc, brass, stainless steel, a copper alloy, etc, molded articles produced by allowing the matrix resin to contain power and/or granules of these metals, and molded articles produced by allowing the matrix resin to contain ceramics, or powder and/or granules of the ceramics, ceramics and so forth. Though the thermoplastic resins such as polyamide, polybutylene terephthalate, polypropylene, ABS and hard polyvinyl chloride can be used as the matrix resin, they are in no way limitative. Examples of the molded articles described above are a molded article containing zinc powder in Nylon 6 ("Calp HG-2700", a product of Calp Kogyo K.K., specific gravity=4.0), a molded article containing tungsten powder in Nylon 6 ("MC-102K01", a product of Kanebo, Ltd., specific gravity=13.0), and so forth. The weight member W described above is located so as not only to adjust the weight of the head main body 1, but also to bring the center of gravity into conformity with the designed centroid. To expand the sweet area and to improve the flying distance of the ball by increasing the depth of the centroid, for example, the weight member W is located on the back side. To expand the sweet area while securing a balance between the toe side and the heel side and to improve directivity of the hit ball, the weight member W is located on the toe side or on the tow and heel sides. Accordingly, at least one of one recess 8 is disposed preferably on at least the back, toe and heel sides of the outer shell portion 2, whenever necessary.

Next, a method of producing the wood type golf club head described above will be explained with reference to FIGS. 4 to 6.

Figure 4:
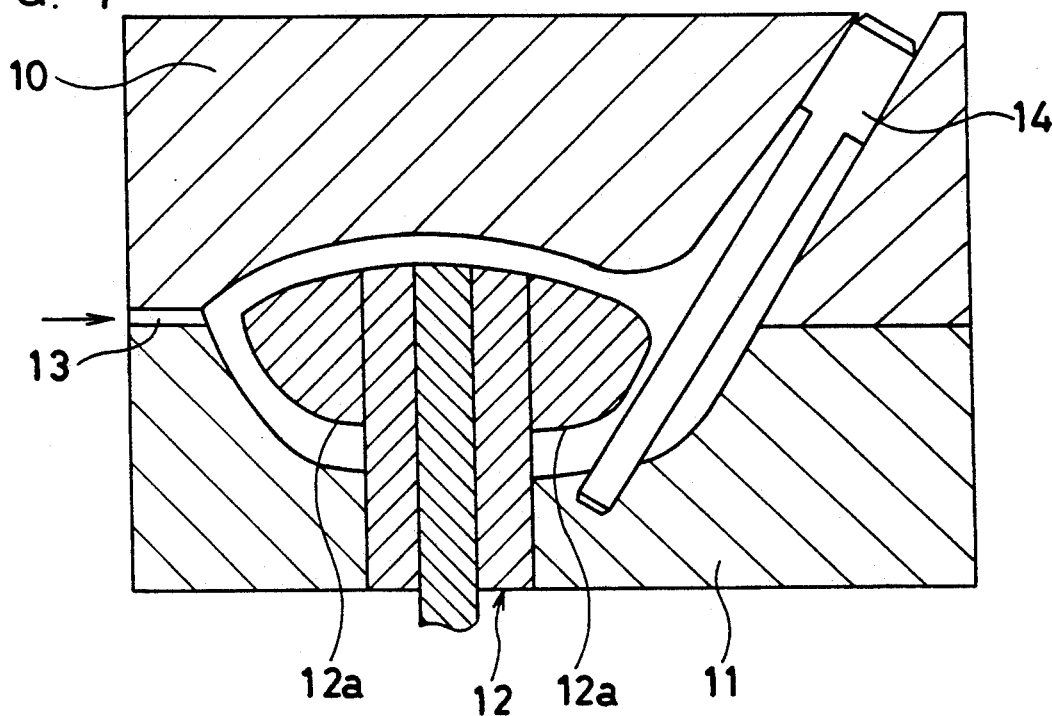
FIGS. 4 to 6 are explanatory sectional views useful for explaining the production method of the wood type golf club head of FIG. 1.
Figure 5:
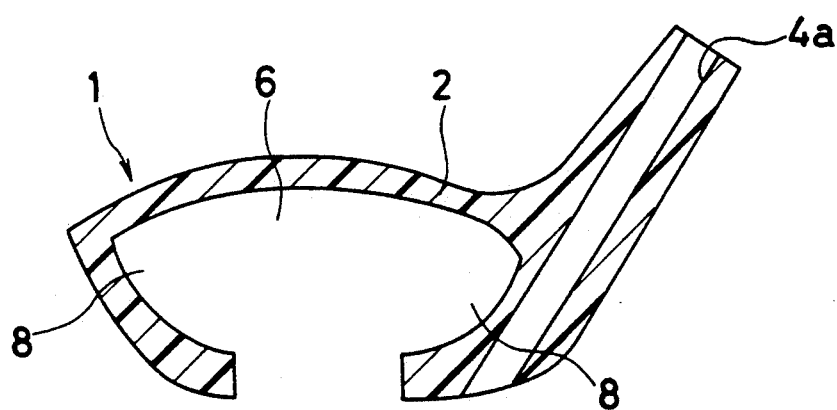
Figure 6:
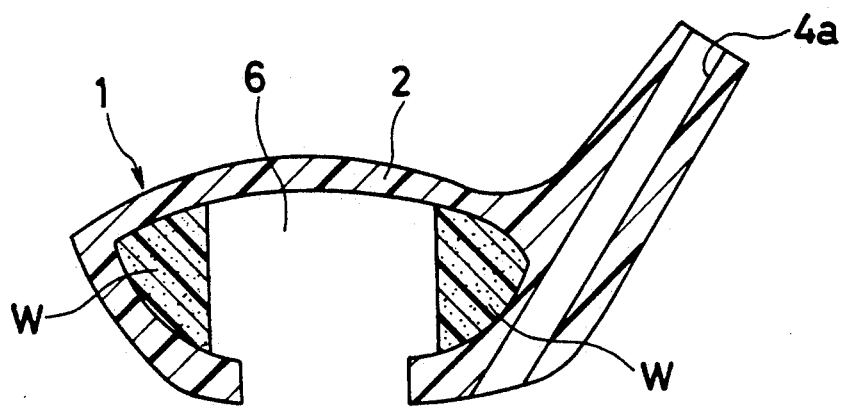

First of all, a separable core 12 having a protrusion 12a projecting out towards at least the back side, toe side and heel side of the head main body 1 and a shaft pin 14 for forming the hole 4a for the club shaft are disposed inside upper and lower molds 10, 11 as shown in FIG. 4. Raw materials consisting principally of the synthetic resin are then injected at 13 into the closed mold by an injection molding machine. After the materials are set, the upper and lower molds 10, 11, the core 12 and its protrusions 12a and the shaft pin 14 are removed, and there is obtained the outer shell portion 2 of the head main body 1 having the recess 8 facing the hollow portion 6 on the inside of the shell portion 2 as shown in FIG. 5. Subsequently, a weight member W of the necessary weight is fixed into the or each recess 8 as shown in FIG. 6. A weight member W produced in advance by a known method may be fixed to each recess 8 by an adhesive, or the weight member W may be shaped by directly casting a binder, e.g. urethane casting compound, containing metal powder, into each recess 8.

After the weight member W is fixed to each recess 8, a foamable material is packed as the core member 7 into the hollow portion 6. While the sole plate 5 is fitted tentatively to the bottom (sole portion) of the head main body 1, the assembly is heated for a predetermined time at a temperature lower than the softening points (in the case of thermoplastic resin, curing and/or heat deformation temperature in the case of thermosetting resin) of the outer shell portion 2 and material of the weight member W. Due to the heating, the foamable material foams and fills the hollow portion 6 to form the core member 7. This core member 7 further fixes the weight members W to the inner surface of the outer shell portion 2. The head main body 1 obtained in this way is cooled to room temperature. The sole plate 5 that has been fixed tentatively is now fixed permanently to the sole of the head main body 1 by a plurality of screws 9 in cooperation with an adhesive. The entire surface of the head main body 1 is polished and painted, providing the wood type golf club head such as the one shown in FIGS. 1 to 3.

Figure 7:
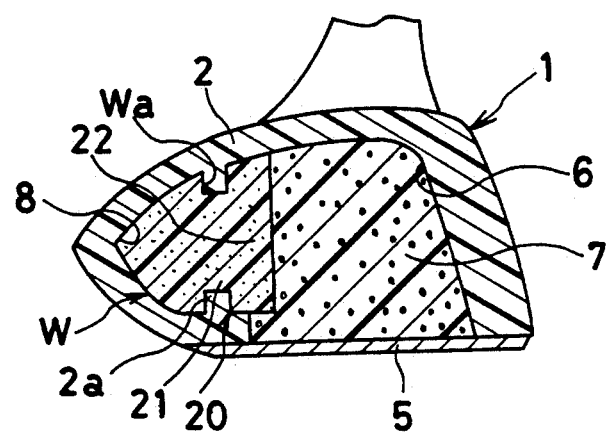
FIG. 7 is a sectional view of a wood type golf club head produced according to another embodiment of the production method of the present invention, and corresponds to the sectional view of FIG. 2 taken along the line 2—2 of FIG. 1.
Figure 8:
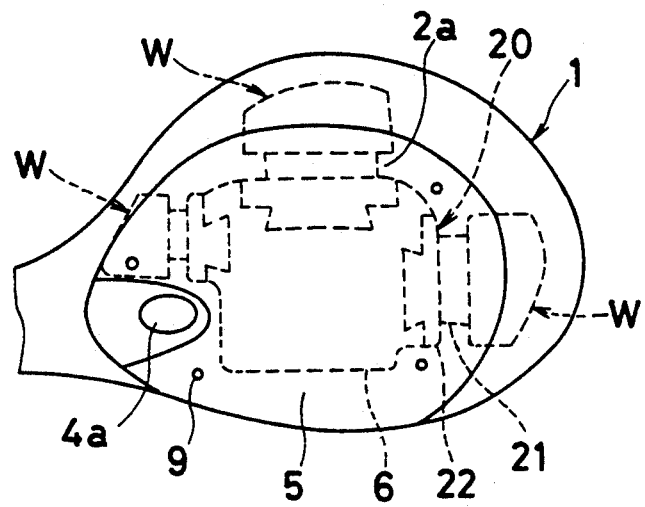
FIG. 8 is a bottom view of the club head of FIG. 7.

FIGS. 7 and 8 show the wood type golf club head produced by another embodiment of the invention. In this wood type golf club head, the weight member or members W described above are provided with an engagement portion 20 capable of engaging with the outer shell portion 2. Therefore, like reference numerals are used to identify like parts described above, and the explanation of such members will be omitted. The engagement portion 20 consists of an engagement member 21 that engages with a protrusion 2a formed on the inside of the outer shell portion as it is molded 2, and a protrusion 22 capable of engaging with a later-appearing core member 30. The engagement members 21, as shown, are slots that engage with protrusions 2a and are located on a side surface Wa of the weight member W adjacent the hollow portion 6, and have a smaller sectional area than the side surface Wa. The protrusion 22 is disposed integrally on the engagement member 21 on the side of the hollow portion 6. The raw material forming the outer shell portion 2 flows around the engagement member 21 during molding of the outer shell portion 2 of the head main body 1 forming protrusions 2a that anchor the weight members W and fix them firmly to the outer shell portion 2. The engagement portion 20 is preferably constituted integrally of the same material as that of the weight member W.

Next, a method of producing the wood type golf club described above will be explained with reference to FIGS. 9 to 11.

Figure 9:
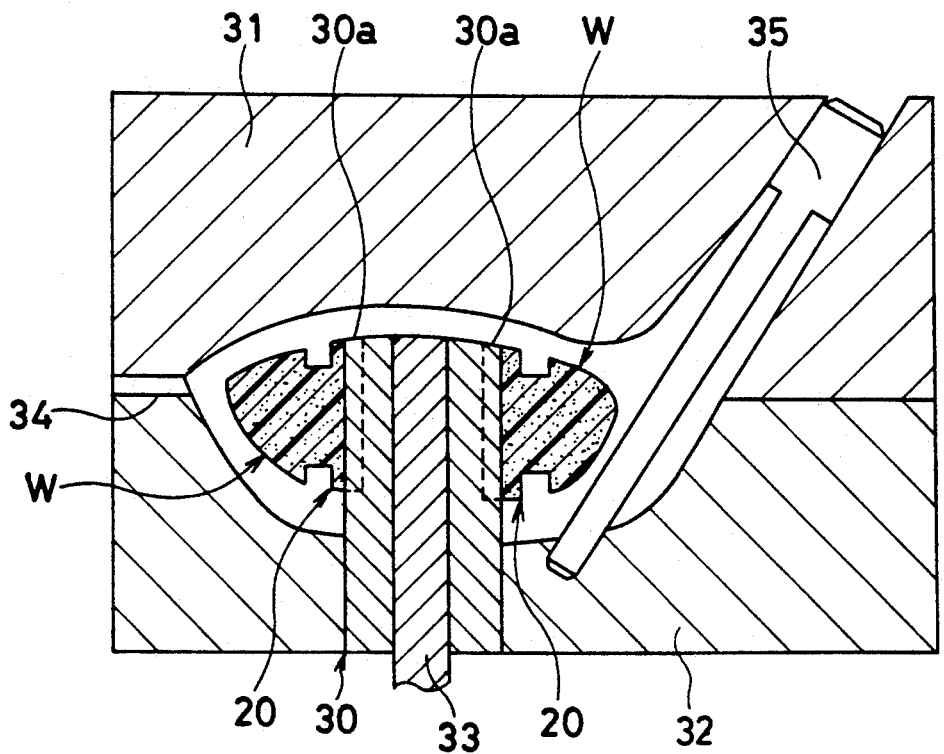
FIGS. 9 to 11 are explanatory sectional views useful for explaining the production method of the wood type golf club head shown in FIG. 7.
Figure 11:
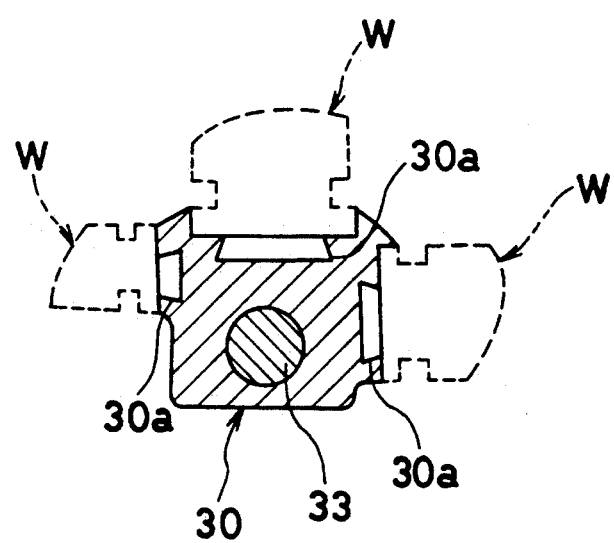

As shown in FIGS. 9 and 11, the mold core 30 used for this method includes channel portions 30a, engage with the complimentary protrusions 22 of the engagement portions 20 of that weight members W, around the portion of the member which is disposed inside the upper and lower molds 31, 32. These channel portions 30a face towards at least one of the back, toe and heel sides of the head main body 1. Reference numeral 33 represents a push-up pin slidably fitted into the center of mold core 30.

Figure 10:
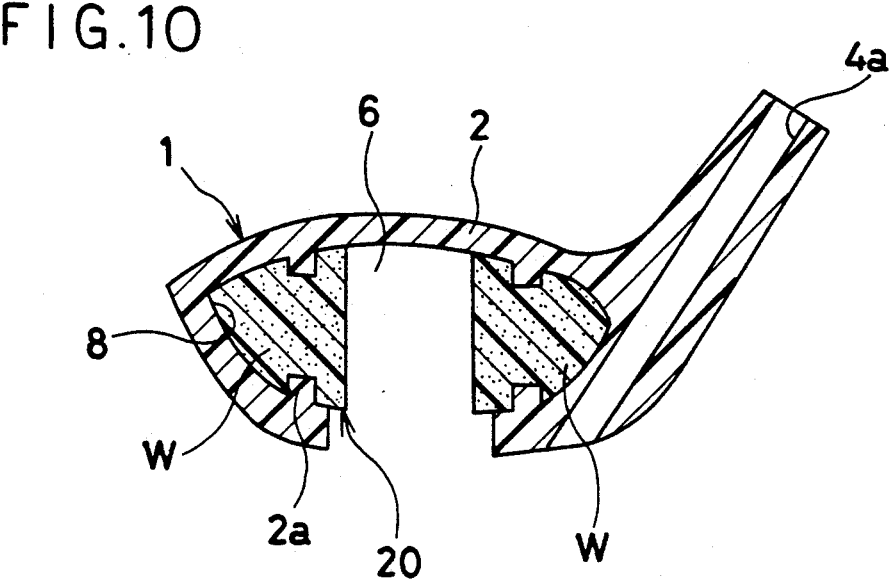

First of all, the mold core 30 is fixed to the lower mold 32 and the weight members W are engaged (tentatively) to the channel portions 30a forming a molding assembly. After the upper mold 31 is placed on top of the lower mold 32 and the shaft pin 35 for forming the hole 4a for the club's shaft is set, the raw materials for molding the outer shell portion 2 are injected by the injection molding machine through the injection gate 34 and the outer shell portion 2 of the head main body 1 is molded. In this instance, the raw materials of the outer shell portion 2 flow around the mold core 30 and weights W and around the engagement members 21 disposed in the weight members W. After the raw materials are set, the weight members W are fixed integrally to the outer shell portion 2. The upper mold 31 is removed and the shaft pin 35 is pulled out. The outer shell portion 2 of the head main body 1 is then lifted up by the push-up pin 33, pushing the outer shell portion 2 out of lower mold 32 and off the mold core 30. In this way, the head main body 1 shown in FIG. 10 is obtained.

Next, the core member 7 is packed into the hollow portion 6 formed inside the outer shell portion 2. If the core member 7 consists of a syntactic foam prepared by mixing glass microballoons into a matrix resin, the paste-like syntactic foam is packed uniformly into the hollow portion 6. Thereafter, a wood type golf club head shown in FIGS. 1, 7 and 8 can be produced in the same way as described above. The core member 7 is so fixed inside the hollow portion 6 as to envelop the protrusions 22 of the weight members W. Accordingly, the weight members W are fixed firmly to the outer shell portion 2 and are fixed also to the core member 7 too.

In the embodiments of the invention described above, molding of the outer shell portion 2 of the head main body 1 is carried out by injection molding, but molding by compression molding can be carried out, too.

As described above, according to the method of producing the wood type golf club and the wood type golf club so produced in the present invention, the outer shell portion equipped with a recess on at least one of the toe, back and heel sides of the head main body is formed and then a weight member is fixed to the at least one recess, or a weight member is disposed in the recess disposed on at least one of the toe, back and heel sides of the head main body and then the outer shell portion and the weight member are molded integrally. Therefore, the weight member can be fitted stably and easily, and the weight as well as the centroid of the head main body can be adjusted easily by this weight member. Furthermore, the weight of the head main body can be distributed extensively to the back side, or the toe and heel sides, the sweet area of the wood type golf club head can be expanded easily, and the flying distance of the golf ball and/or directivity of the hit ball can be improved. The molding operation of the wood type golf club head can be facilitated and productivity and work efficiency can be improved drastically. If the weight member is provided with the engagement portion capable of engaging with the outer shell portion, the weight member can be fixed firmly in an accurate position, and errors in the position of the weight member due to impacts at the time of hitting the ball can be drastically prevented.

EXAMPLE

The outer shell portion was molded integrally by injection molding using a pellet consisting primarily of ½ in. long carbon fiber and Nylon 66 ("Cellstran N66C40", a product of Hoechst-Celanese Corp.). In this case, recesses for burying a weight member were formed on the toe, back and heel sides of a hollow portion such as the one shown, in FIG. 3. Weight members having the correct weight were bonded by an adhesive in the recesses so that the desired centroid of the head main body and the desired weight adjustment could be obtained. These weight members were composed of a molded article containing zinc powder in Nylon 6 ("Calp HG-2700", a product of Calp Kogyo K.K., specific gravity=4.0).

Next, a foamable material consisting of foamable beads ("EXPANCEL", a product of Nippon FILLITE K.K.) was fitted into the hollow portion, and while a sole plate was fitted tentatively to the sole portion, the head main body was placed into an oven and heated at about 120° C. for 30 minutes to foam the foamable material. After cooling to room temperature, the sole plate of the sole portion was fixed by a plurality of screws in combination with an adhesive. The entire surface of the head was then polished and painted. In this way, a wood type golf club head is produced.

A shaft was fitted to each of the resulting wood type golf club heads to provide a wood type golf club, and its durability was tested by actually hitting balls. The feel at the time of hitting was comparable to the conventional golf clubs. When the each head main body was cut and the weight members were examined after hitting a ball including 70 g lead weight at a head speed of 40 m/s 2000 times, the weight members were found to be fixed in the recesses of the outer shell portion without any position error, and were thus found to be fitted stably.

What is claimed is:

1. A method for producing a wood type golf club head having a head main body, said body having an outer shell portion, top and bottom sides, face and back sides and toe and heel sides, a weight member embedded in said body adjacent at least one of said toe, heel and back sides and a sole plate on the bottom side of the body, said method comprising molding and curing the outer shell portion of the head main body from a synthetic resin, with a hollow portion inside thereof accessible from the bottom side of the body and a recess on the inside adjacent at least one of the toe, back and heel sides thereof and facing said hollow portion, inserting a weight member into said hollow portion and fixing the weight member into said at least one recess, packing a core member into said hollow portion, and securing a sole plate to said bottom side of said head main body.

2. The method of claim 1, wherein said synthetic resin contains reinforcing fibers.

3. The method of claim 1, wherein said core member is of a foamable material, the method including foaming said material in place in said hollow portion to form said core member.

4. The method of claim 1, wherein said weight member is made of a resin containing metal particles.

5. A method for producing a wood type golf club head having a head main body, said body having an outer shell portion, top and bottom sides, face and back sides and toe and heel sides, a weight member embedded in said body adjacent at least one of said toe, back and heel sides of said body, and a sole plate on the bottom side of the body, said method comprising securing said weight member to a mold core to form a molding assembly, said weight member being separable from said mold core by sliding the mold core relative to said weight, said weight member having an engageable member on an outer surface thereof, placing said molding assembly inside a mold shaped to form said outer shell portion of said head main body so that a part of the mold core protrudes from said mold in the direction of sliding, molding and curing said outer shell portion in said mold from a synthetic resin by flowing it around said molding assembly so that said weight member is surrounded by and said engageable member of the weight member is integrally locked in said outer shell portion, sliding the mold core relative to the weight member to separate the weight member and the outer shell portion therefrom, said weight member remaining locked in said outer shell portion and said separated mold core leaving a hollow portion in the interior of the body adjacent said weight member accessible from the bottom side of the body, packing a core member into said hollow portion and securing a sole plate to said bottom side of said club head main body.

6. The method of claim 5, wherein said synthetic resin contains reinforcing fibers.

7. The method of claim 5, wherein said core member is of a foamable material, the method including foamable said material in place in said hollow portion to form said core member.

8. The method of claim 5, wherein said weight member is made of a resin containing metal particles.

9. The method of claim 5, wherein the outer shell portion is molded by injecting a fiber reinforced thermoplastic resin into said mold.

10. The method of claim 5, wherein the engageable member on the weight is a slot on the outer surface thereof into which the resin forming the outer shell portion flows as the shell is being molded.

* * * * *